US008901022B2

(12) United States Patent
Francy et al.

(10) Patent No.: US 8,901,022 B2
(45) Date of Patent: Dec. 2, 2014

(54) POWDER FOR DRY REFRACTORY MATERIAL

(75) Inventors: Olivier Jean Francy, L'isle sur la Sorgue (FR); Eric Jorge, Les Valayans (FR)

(73) Assignee: Saint0Gobain Centre de Recherches et d'Etudes Europeen, Courbevoie (FR)

( * ) Notice: Subject to any disclaimer, the term of this patent is extended or adjusted under 35 U.S.C. 154(b) by 146 days.

(21) Appl. No.: 13/517,398

(22) PCT Filed: Dec. 23, 2010

(86) PCT No.: PCT/IB2010/056063
§ 371 (c)(1),
(2), (4) Date: Aug. 2, 2012

(87) PCT Pub. No.: WO2011/077411
PCT Pub. Date: Jun. 30, 2011

(65) Prior Publication Data
US 2012/0309608 A1 Dec. 6, 2012

(30) Foreign Application Priority Data
Dec. 24, 2009 (FR) ..................................... 09 59580

(51) Int. Cl.
*C04B 35/00* (2006.01)
*C04B 35/48* (2006.01)
*C04B 35/101* (2006.01)
*C04B 35/106* (2006.01)
*F27D 1/00* (2006.01)
*C04B 35/626* (2006.01)
*C22B 1/243* (2006.01)

(52) U.S. Cl.
CPC ....... *C04B 35/62665* (2013.01); *C04B 2235/95* (2013.01); *C04B 2235/3232* (2013.01); *C04B 35/1015* (2013.01); *C04B 2235/3201* (2013.01); *C04B 2235/3208* (2013.01); *C04B 35/106* (2013.01); *C04B 2235/3418* (2013.01); *C04B 2235/445* (2013.01); *C04B 2235/3206* (2013.01); *C04B 2235/94* (2013.01); *C04B 2235/5472* (2013.01); *C04B 2235/3244* (2013.01); *C04B 2235/6027* (2013.01); *C04B 2235/3241* (2013.01); *C04B 2235/9676* (2013.01); *C04B 2235/9607* (2013.01); *C04B 2235/3409* (2013.01); *C04B 2235/3217* (2013.01); *C04B 2235/5436* (2013.01); *F27D 1/0006* (2013.01); *C04B 2235/77* (2013.01);
*C04B 2235/96* (2013.01); *C04B 2235/3272* (2013.01); *C04B 2235/5427* (2013.01); *C04B 2235/5409* (2013.01); *C22B 1/243* (2013.01); *C04B 2235/349* (2013.01)
USPC .......................... 501/127; 501/105; 501/153

(58) Field of Classification Search
USPC ......................................... 501/127, 105, 153
See application file for complete search history.

(56) References Cited

U.S. PATENT DOCUMENTS

| | | | | |
|---|---|---|---|---|
| 4,430,440 | A | * | 2/1984 | Wada et al. .................... 501/105 |
| 4,902,651 | A | * | 2/1990 | Wada et al. ...................... 501/87 |
| 6,121,177 | A | | 9/2000 | Guigonis et al. |
| 2004/0157725 | A1 | | 8/2004 | Doza et al. |

FOREIGN PATENT DOCUMENTS

| | | |
|---|---|---|
| CN | 1761635 A | 4/2006 |
| DE | 4041061 A1 | 6/1991 |
| WO | 2010001065 A2 | 1/2010 |

OTHER PUBLICATIONS

Translation of Office Action issued by the State Intellectual Property Office of People's Republic of China in counterpart Chinese counterpart patent application 201080059264.4 dated Jul. 24, 2013.
Office Action issued by the Chinese Patent Office issued Jul. 24, 2013.
"Preparation and Performance of Al2TiO5—ZrO2 Multiphase Materials" Wang Ronglin et al., Materials Engineering, No. 5, pp. 38-41, Dec. 31, 2005, with abstract in English.
International Search Report dated Apr. 27, 2011.
Applied Ceramic Techonlogy, "Improved Thermal Shock Performance of Sintered Mg-Partially Stabilized Zirconia with Alumina and Titania Additions" pp. 1-13; Jan. 1, 2009.

* cited by examiner

*Primary Examiner* — Noah Wiese
(74) *Attorney, Agent, or Firm* — Cooper Legal Group, LLC

(57) ABSTRACT

The invention relates to a powder comprising more than 70% of refractory particles, in weight percent relative to the weight of the powder, a particle of said powder being classed in the fraction called "matrix" or in the fraction called "aggregate", according to whether it is smaller than, or equal to 100 μm, or larger than 100 μm, respectively, said powder comprising, in weight percent relative to the weight of the powder: between 0.1% and 18% of particles of a heat-activatable binder, called "heat-activatable binder particles"; and more than 40% of refractory particles, called "ATZ particles", having the following chemical composition, in weight percentages on the basis of the oxides of said ATZ particles: $10\% \leq Al_2O_3 \leq 55\%$; $35\% \leq TiO_2 \leq 80\%$; $1\% \leq MgO+Cr_2O_3 \leq 10\%$; $8\% \leq ZrO_2 \leq 20\%$; $SiO_2 \leq 8\%$.

20 Claims, No Drawings

POWDER FOR DRY REFRACTORY MATERIAL

TECHNICAL FIELD

The invention relates to a powder of the dry refractory ramming material or "DVC", "dry vibratable mix" or "dry refractory" type, especially intended for the manufacture of lining for furnaces, for example induction furnaces, in particular for melting metals.

The invention also relates to a consolidated product obtained from a powder according to the invention and to a process for manufacturing such a product.

PRIOR ART

A lining of a furnace for melting metals should especially have:
good crack resistance;
good resistance to infiltration by the molten metal; and
good thermal shock resistance.

For this purpose, use is made of the products obtained by consolidation heat treatment of powders of DVC type, such as described for example in EP 1 224 153.

A powder of DVC type is a powder which, unlike a concrete, can be used "dry", that is to say without addition of water or of liquid binder, or, rarely, with a very reduced amount of water or of liquid binder (typically less than 3%), unlike a concrete. This is why, unlike a concrete, a powder of DVC type does not conventionally comprise any binder capable of setting via addition of water. The possible teachings which could be drawn from the study of documents relating to concretes cannot therefore, a priori, be transposed to powders of this type.

The forming of a powder of DVC type conventionally results from a simple compaction at ambient temperature, the consolidation resulting from a subsequent consolidation heat treatment.

Equally conventionally, a powder of DVC type is constituted of refractory particles and particules of a heat-activatable binder. The temperature of the consolidation heat treatment is between the melting point of the heat-activatable binder and that of the refractory particles. During the consolidation heat treatment, the heat-activatable binder can thus change from the solid state to a viscous liquid state enabling adhesion to the refractory particles and bonding between the latter. The change from the solid state to this viscous liquid state is referred to as "activation" of the binder.

The heat-activatable binder is also chosen so as to be able to be in this viscous liquid state at a temperature close to the operating temperature of the furnace, in particular during the first temperature rise. This viscous liquid state thus advantageously makes it possible to reduce the rigidity of the consolidated product, facilitating its deformation and thus increasing its ability to adapt to local thermomechanical stresses. During the following temperature rises, this liquid state may be modified, and may especially become rigid via an enrichment of fine particles.

The article "*Spinel formation in coreless induction furnace linings*", Saikia et al., Proceedings of the 4$^{th}$ International Symposium on Advances in Refractories for the Metallurgical Industries, p 827-840 (2004) describes powders of DVC type based on alumina and/or on $MgAl_2O_4$ spinel. The sintered products obtained from these powders have good resistance to corrosion by the metals being melted. However they have a limited thermal shock resistance, especially in the case of melting light alloys or aluminum alloys, because of severe thermal shocks. The thermal shocks create cracks that are the cause of prejudicial phenomena of infiltration by the metals being melted.

JP 3 183 656 describes powders of DVC type based on crystallized silica. The sintered products obtained from these powders have the advantage of good thermal shock resistance, especially during repetitive temperature rises and drops. However, these sintered products have a limited corrosion resistance and limited resistance to infiltration by the metals being melted. They also pose health problems during their installation, especially due to the potential presence of crystalline silica dust.

To improve the thermal shock resistance, it is known to add fine particles of monoclinic zirconia or grains of mullite-zirconia and/or of alumina-zirconia. The accident of thermal expansion of the zirconia creates a network of microcracks that favor the absorption of the crack propagation energy. For this purpose, it is also known to add fine silica particles.

There is a constant need for a powder that makes it possible to manufacture consolidated products, especially sintered products, having a good thermal shock resistance and a good resistance to infiltration by the metals being melted.

One objective of the invention is to satisfy this need.

SUMMARY OF THE INVENTION

The invention relates to a powder comprising more than 70%, preferably more than 80%, more than 90% of refractory particles, a particle of said powder being classified in the "matrix" fraction or in the "aggregate" fraction depending on whether it has a size less than or equal to 100 μm, or greater than 100 μm, respectively, said powder comprising, in percentages by weight in relation to the weight of the powder:

more than 40% of refractory particles, referred to as "ATZ particles", having the following chemical composition, as percentages on the basis of the oxides of said ATZ particles:

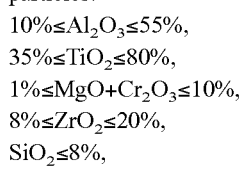

from 0.1% to 18% of particles of a heat-activatable binder, in particular an inorganic binder and/or at least one resin, referred to as "heat-activatable binder particles".

As will be seen in greater detail in the remainder of the description, the inventors have discovered that a powder according to the invention results in a product that has particularly good resistance to thermal shocks and to infiltration.

The inventors have also discovered that this product advantageously has a reduced expansion coefficient, which limits the appearance of cracks.

A powder according to the invention may also comprise one or more of the following optional characteristics:

preferably, the matrix represents more than 10%, more than 15%, preferably more than 20% and/or less than 40%, preferably less than 35% of the weight of the powder, the balance to 100% being, by definition, constituted by the aggregate.

The powder comprises more than 45%, or even more than 50% and/or less than 80%, less than 70%, or even less than 65% of ATZ particles.

The composition of the ATZ particles is such that:
  the content of $Al_2O_3$ is greater than 20%, greater than 25%, greater than 30%, or even greater than 35% and/or less than 50%, less than 45%, less than 40%; and/or
  the content of $TiO_2$ is greater than 40% and/or less than 70%, less than 65%, less than 60%, less than 55%; and/or
  the content of $MgO+Cr_2O_3$ is greater than 2% and/or less than 8%; and/or
  the content of $Cr_2O_3$ is less than 0.5%, less than 0.2%, or even substantially zero; and/or
  the content of $ZrO_2$ is greater than 10% and/or less than 15%; and/or
  the content of $SiO_2$ is less than 5%, or even less than 2%, or even substantially zero; and/or
  $Fe_2O_3 \leq 1\%$.
In one embodiment, the content of $SiO_2$ in the ATZ particles is greater than 1%.
The ATZ particles comprise an oxide phase in the form of a solid solution of aluminum titanate type comprising:
  titanium,
  aluminum,
  iron,
  magnesium and/or chromium and
  zirconium,
  said oxide phase representing at least 60%, preferably at least 70%, or even at least 75% of the total weight of the oxides of the ATZ particles.
The ATZ particles comprise a minor silicate phase preferably comprising more than 40%, or even more than 50% of silica, as a weight percentage on the basis of said silicate phase.
The ATZ particles comprise a minor phase preferably comprising more than 80%, or even more than 90% of titanium oxide $TiO_2$ and/or of zirconium oxide $ZrO_2$, as a weight percentage on the basis of said minor phase.
The ATZ particles are fused particles, that is to say obtained by a process comprising a melting of a feedstock then hardening, by cooling, of the molten material.
The ATZ particles are particles in accordance with those described and/or claimed in French patent application FR 08/54582, incorporated by reference.
The powder comprises more than 10%, more than 20%, or even more than 30% and/or less than 50%, or even less than 40% of particles having a size of greater than 1 mm.
The powder comprises more than 10%, more than 20%, or even more than 30% and/or less than 50%, or even less than 40% of particles having a size between 0.1 mm and 1 mm.
The powder has the following characteristics:
  the maximum size of the particles is less than 5 mm, and
  the amount of particles having a size greater than 300 μm is greater than 50% and less than 70%, and
  the amount of matrix is greater than 15%, preferably greater than 20%, and less than 40%, and
  the amount of particles having a size of less than 75 μm is greater than 10% and less than 35%.
The powder preferably comprises more than 1%, more than 2%, more than 3%, more than 4%, more than 5%, and/or less than 15%, less than 12%, less than 10%, or even less than 8%, or even less than 6% of heat-activatable binder.
More than 80%, more than 90%, or even substantially 100% of the particles of the heat-activatable binder are in the matrix, as percentage by weight on the basis of the weight of the heat-activatable binder.

Preferably, the heat-activatable binder has a melting point of greater than 5° C., preferably of greater than 15° C., preferably of greater than 20° C., or even greater than 30° C., greater than 50° C., greater than 70° C., greater than 80° C., greater than 150° C., and/or less than 1500° C., less than 1300° C., less than 1200° C.
Preferably, the heat-activatable binder has a melting point between 150° C. and 1200° C.
Preferably, the heat-activatable binder is not a metal.
The heat-activatable binder is selected from the group formed by boron oxide, boric acid, borates, cryolite, fluoride salts, silicate compounds, phosphate compounds, feldspars, magnesium chlorides, colemanite, clay, kaolin, amorphous silica, in particular fumed silica, resins, ceramic frits, and mixtures thereof. The resin may in particular be chosen from phenolic resins, furan resins, acrylic resins, polyester resins, epoxide resins, silicone resins, siloxane resins, alkyd resins, polyvinyl resins, and mixtures thereof. In one particular embodiment, the resin is chosen from particulate products that can be converted to a polymer during the consolidation heat treatment.
Preferably, the heat-activatable binder is selected from the group formed by sodium borates, potassium borates, calcium borates, boric acid, boron oxide, clay, fluoride salts, and mixtures thereof. Preferably, the heat-activatable binder is selected from the group formed by boric acid, boron oxide, clay, fluoride salts, and mixtures thereof.
Preferably, the heat-activatable binder is inorganic.
The powder comprises more than 2%, more than 3%, or even more than 4% and/or less than 10%, less than 8% or even less than 7% of clay.
The powder comprises more than 0.5%, more than 1%, and/or less than 5%, less than 4% or even less than 3% of boric acid.
The powder comprises more than 0.1%, more than 0.5% and/or less than 5%, less than 3%, or even less than 2% of $KBF_4$.
The powder contains an agent that makes it possible to reduce, or even eliminate, the dust during the installation of the powder. This "anti-dust agent" may be chosen from the group formed by oils, in particular mineral oils, kerosene, organic polymers and mixtures thereof. Preferably, this agent is kerosene. Preferably, the amount of anti-dust agent is between 0.1% and 1%.
The powder contains at least one agent that makes it possible to reduce the wettability of said powder and/or of the consolidated product obtained from said power to the metals being melted. Preferably, this "anti-wetting agent" is chosen from silicon carbide, barium sulphate, SiAlON compounds, nitrides. Preferably, this agent is chosen from silicon carbide and barium sulphate. More preferably, the anti-wetting agent is barium sulphate. Preferably, the anti-wetting agent is introduced in the form of particules having a size of less than or equal to 100 μm. Preferably, the amount of anti-wetting agent is between 5% and 15%, preferably between 5% and 10%.
The refractory particles and the particles of the heat-activatable binder together represent more than 81%, more than 85%, more than 90%, more than 93%, or even more than 95%, or even more than 98% of the weight of the powder.
The powder is more than 95%, or even more than 98%, or even substantially 100% constituted of refractory particles, of heat-activatable binder particles, optionally of anti-dust agent particles and optionally of anti-wetting agent particles, the possible balance to 100% being constituted of impurities, for example of iron originating from a milling step.

The impurities represent less than 3%, less than 2%, or even less than 1%.

The powder does not contain hydraulic binder or organic binder apart from, optionally, a resin. In one embodiment, the powder contains neither hydraulic binder, nor organic binder. In a first embodiment, the powder contains neither hydraulic binder, nor organic binder apart from, optionally, a resin. In a second embodiment, the powder contains neither hydraulic binder nor organic binder.

The aggregate, the particles of which are called "grains", may also comprise one or more of the following optional characteristics:

The amount of grains having a size of greater than 300 μm is greater than 30%, greater than 40%, or even greater than 50% and/or less than 70%.

More than 60%, more than 70%, more than 75% of the grains of the aggregate are ATZ particles, as percentages on the basis of the weight of the aggregate. The ATZ particles of the aggregate are denoted by "ATZ grains".

The powder comprises more than 30%, or even more than 40% or more than 50% and/or less than 80%, less than 70%, or even less than 65% of ATZ grains.

The powder comprises more than 20%, or even more than 25% or more than 30% and/or less than 50%, less than 45%, or even less than 40% of ATZ grains having a size greater than 1 mm.

The aggregate comprises, in addition to the ATZ grains, additional refractory grains made of a material chosen from the group formed by alumina, magnesia, chromium oxide, silica, bauxite, mullite, zirconia, partially stabilized zirconia, stabilized zirconia, mullite-zirconia, alumina-zirconia, magnesia-alumina spinel, zircon, cordierite, aluminum titanate, argillaceous chamottes containing between 30% and 50% of alumina, preferably between 35% and 45% of alumina, wollastonite, alumina-zirconia-silica (or "AZS") materials, alumina-zirconia-silica-chromium oxide (or "AZS—Cr") materials, bauxite, alumina-reinforced zirconias, and mixtures thereof. Preferably, said additional refractory grains are made of a material chosen from the group formed by alumina, mullite, argillaceous chamottes containing between 30% and 50% of alumina, preferably between 35% and 45% of alumina, bauxite and mixtures thereof. Preferably, the additional refractory grains are made of a material chosen from the group formed of alumina, mullite and mixtures thereof. Preferably, the ATZ grains and the additional refractory grains together represent more than 80%, more than 90% or even substantially 100% of the refractory grains of the aggregate.

The maximum size of the grains, and in particular of the ATZ grains, is less than or equal to 10 mm, preferably less than or equal to 8 mm, preferably less than or equal to 6 mm, or even less than or equal to 4 mm.

The maximum size of the additional refractory grains is less than 5 mm, preferably less than 4 mm, preferably less than 2 mm, preferably less than 1 mm.

The aggregate comprises less than 20%, less than 10%, or even less than 5%, or even substantially no particles of said heat-activatable binder, referred to as "binder grains", in percentages by weight on the basis of the powder.

The matrix, the particles of which are called "fine particles", may also comprise one or more of the following optional features:

The amount of fine particles having a size of less than 75 μm is between 10% and 35%.

The matrix comprises more than 1% and/or less than 10%, less than 5%, or even less than 3%, of ATZ particles, referred to as "fine ATZ particles" (as weight percentages on the basis of the powder). In one embodiment, the matrix comprises substantially no ATZ particles.

The matrix contains, in addition to the fine ATZ particles, additional fine refractory particles made of a refractory material chosen from the group formed by alumina, magnesia, chromium oxide, silica, bauxite, mullite, zirconia, partially stabilized zirconia, stabilized zirconia, mullite-zirconia, alumina-zirconia, magnesia-alumina spinel, zircon, cordierite, aluminum titanate, argillaceous chamottes containing between 30% and 50% of alumina, preferably between 35% and 45% of alumina, wollastonite, alumina-zirconia-silica (or "AZS") materials, alumina-zirconia-silica-chromium oxide (or "AZS—Cr") materials, bauxite, alumina-reinforced zirconias, and mixtures thereof. Preferably, said additional fine refractory particles are made of a refractory material chosen from the group formed by alumina, mullite, argillaceous chamottes containing between 30% and 50% of alumina, preferably between 35% and 45% of alumina, bauxite and mixtures thereof. More preferably, said additional fine refractory particles are made of a refractory material chosen from the group formed of alumina, mullite and mixtures thereof. Preferably, the fine ATZ particles and the additional fine refractory particles together represent more than 80%, more than 90%, or even substantially 100% of the fine refractory particles of the matrix.

The amount of additional fine refractory particles is greater than 5%, greater than 10%, greater than 15%, and/or less than 40%, less than 30%, or even less than 25%.

More than 80%, or even more than 90%, or even substantially 100% of the heat-activatable binder belongs to the matrix, as a percentage on the basis of the weight of the heat-activatable binder.

The amount of fine heat-activatable binder particles is preferably greater than 1%, greater than 3%, greater than 5%, and/or preferably less than 15%, preferably less than 10%.

The invention also relates to a product obtained by consolidation heat treatment of a powder according to the invention, in particular in the form of a block or a lining.

The product preferably comprises more than 1%, more than 2%, more than 3%, more than 4%, more than 5%, and/or less than 15%, less than 12%, less than 10%, or even less than 8%, or even less than 6% of heat-activatable binder and/or of product of conversion of said heat-activatable binder resulting from said consolidation heat treatment.

The invention also relates to a process for manufacturing a consolidated product according to the invention, comprising the following successive steps:

a) preparation of a feedstock from a powder according to the invention;
  (1) the feedstock comprising a powder according to the invention and the liquid phase in said feedstock representing less than 3%, preferably less than 2%, more preferably substantially 0% of the weight of the feedstock; or
  (2) the feedstock being constituted of a mix comprising water and/or a temporary binder, as described below;

b) forming said feedstock by pressing, ramming or vibration;

c) consolidation heat treatment of the formed feedstock at a temperature above the melting point of the heat-activatable binder, and less than the melting point of the refractory particles.

This process may be implemented in order to manufacture the side wall and bottom of a crucible of an induction furnace. The side wall and the bottom of such a crucible together constitute the "lining" of the furnace.

In case (1), the water, or even the liquid phase in said feedstock, preferably represents less than 2% of the weight of the feedstock. More preferably, and in particular for a coreless induction furnace lining, the feedstock does not comprise water, or temporary binder.

The bottom of the crucible, or "floor", is produced by pouring into the chamber of the furnace, the feedstock, preferably constituted of a powder according to the invention. The layer thus constituted is then for example rammed or vibrated. After a leveling operation which also makes it possible to eliminate the upper layer of the floor that is more weakly densified, a mold is provisionally positioned on the layer thus obtained.

In order to produce the side wall of the crucible, the pouring of the feedstock is then continued between the chamber of the furnace and the mold positioned in said chamber, preferably until the feedstock surrounds the mold over its entire height. Said chamber may especially be constituted of a layer of insulating materials.

Preferably, the feedstock is compacted by vibration. The compaction may be carried out as the feedstock is poured.

A temperature rise then enables activation of the heat-activatable binder, that is to say enables the heat-activatable binder particles to melt into a viscous form, and thus ensure the cohesion of the refractory particles.

In step c), the consolidation heat treatment is preferably carried out at a temperature above the operating temperature $T_{operating}$. The duration of the hold at the maximum temperature reached during the consolidation heat treatment is preferably greater than 30 minutes, preferably greater than one hour and/or less than ten hours, preferably less than three hours.

The consolidation heat treatment may be a sintering.

After cooling, the heat-activatable binder forms a binder phase between the refractory particles. A product that is said to be "consolidated" is thus obtained. Typically, the open porosity of such a consolidated product is between 10% and 30%.

If the activation temperature was not reached over the entire thickness of the side wall and of the bottom of the crucible, a portion of the crucible, in particular in the vicinity of the inductor of the furnace, may not be consolidated.

After the consolidation heat treatment step, the mold is removed or eliminated and the crucible is ready to be used for melting metal.

This process for manufacturing a consolidated product may also be carried out for the manufacture of individual blocks intended to be assembled with other blocks. It is then preferable, according to option (2), to add to the powder a temporary binder and/or water. A mix is then obtained which can be poured into a mold and which makes it possible, after step b), to obtain a preform having, at ambient temperature, a "cold" strength.

The invention also relates to such a mix.

Preferably, the amount of temporary binder in this mix is greater than 0.5% and/or less than 6%, and the amount of water is greater than 2% and/or less than 6%, or even less than 5%, as percentages by weight relative to the weight of the powder before addition of the temporary binder and water.

Temporary binders conventionally used for the manufacture of sintered ceramic blocks may be used, for example dextrin, a calcium lignosulphonate, CMC, or a PEG.

The invention also relates to the use of a consolidated product according to the invention in an application in which at least one part of said consolidated product is subjected to an operating temperature $T_{operating}$ below the maximum consolidation heat treatment temperature.

The invention also relates to a furnace for melting metals that comprises at least one region constituted of a consolidated product according to the invention, in particular a region intended to be in contact with a metal being melted.

The furnace may in particular be a furnace for melting aluminum, aluminum alloys, such as for example the alloy of reference 42200 according to the standard NF EN 1706, magnesium alloys, zinc alloys or copper alloys.

Of course, the nature of the refractory grains is determined such that the melting point of said grains is above the temperature to which it is anticipated to subject said region.

Finally the invention relates to a process for manufacturing a furnace, in particular a furnace for melting metals, in which at least one block made of a product according to the invention is assembled or in which a crucible comprising a product according to the invention is manufactured, in particular in a region intended to come into contact with the metal being melted.

DEFINITIONS

The term "powder" is understood mean a dry particulate mix.

The term "particles" refers to the constituent solid elements of a powder. The particles of the matrix are referred to as "fine particles" and the particles of the aggregate are referred to as "grains".

The "size" of a particle is given conventionally by a characterization of particle size distribution. A laser particle size analyzer enables, for example, the measurement of sizes of less than or equal to 5 mm.

The percentiles or "centiles" 10 ($D_{10}$), 50 ($D_{50}$), 90 ($D_{90}$) and 99.5 ($D_{99.5}$) of a powder are the sizes of particles corresponding to the percentages, by weight, of 10%, 50%, 90% and 99.5% respectively on the cumulative particle size distribution curve of the particles of the powder, the sizes of particles being classified in increasing order. For example, 10%, by weight, of the particles of the powder have a size of less than $D_{10}$ and 90% of the particles by weight have a size of greater than $D_{10}$. The percentiles may be determined using a particle size distribution produced using a laser particle size analyzer.

The expression "maximum size" refers to the percentile 99.5 ($D_{99.5}$) of said powder.

The expression "median size" refers to the percentile $D_{50}$, that is to say the size dividing the particles into first and second populations that are equal by mass, these first and second populations comprising only particles having a size greater than, or less than respectively, the median size.

The term "impurities" is understood to mean the inevitable constituents, introduced involuntary and inevitably with the raw materials or resulting from reactions with these constituents. The impurities are not necessary constituents, but only tolerated constituents. Preferably, the amount of impurities is less than 2%, less than 1%, less than 0.5%, or even substantially zero.

The expression "refractory material" is understood to mean a material having a melting point above 1500° C. This definition is commonly used by a person skilled in the art and is cited in "*Matériaux réfractaires et céramiques techniques (éléments de céramurgie et de technologie)* [Engineering refractory and ceramic materials (ceramurgy and technology components)]", G. Aliprandi, published by Septima Paris, 1979. This work also gives, on pages 297 to 301, examples of refractory materials, especially oxides, carbides and nitrides.

The expression "heat-activatable binder" is understood to mean a constituent which, under the effect of an increase in the temperature, will liquefy into a viscous form suitable for agglomerating the particles of a refractory powder in which it is mixed. By way of examples, boric acid, potassium tetrafluoroborate and cryolite melt at melting points between 150° C. and 300° C., of around 530° C. and of 1010° C., respectively, giving viscous phases capable of agglomerating the particles of a powder according to the invention, that is to say capable of resulting in a structured (self-supporting) product.

The term "borate" is understood to mean a compound of oxoanions based on boron and on electropositive elements. The oxoanion based on boron may be the borate oxoanion $BO_2^-$, the diborate oxoanion $B_2O_5^{4-}$, the triborate oxoanion $B_3O_5^-$, the tetraborate oxoanion $B_4O_7^{2-}$. Sodium tetraborate $Na_2B_4O_7$, lithium triborate $LiB_3O_5$, magnesium diborate $Mg_2B_2O_5$ are examples of borates. The borates may also be hydrated, such as for example borax $Na_2B_4O_7 \cdot 10H_2O$.

The term "temporary" is understood to mean "eliminated from the product during the consolidated heat treatment".

"$MgO+Cr_2O_3$" is conventionally understood to mean "$MgO$ and/or $Cr_2O_3$".

A phase is referred to as "minor" when another phase having a higher weight content is present.

All the percentages are expressed by weight relative to the weight of the powder, unless otherwise indicated (in particular, the composition of the ATZ particles is expressed as percentages on the basis of the oxides of these particles).

Conventionally, the characteristics relating to a state of matter (melting point, viscosity, etc.) are provided at a pressure of 1 bar, unless otherwise indicated.

DETAILED DESCRIPTION

Preferably, a powder according to the invention is formed by the sole mixing of refractory particles and heat-activatable binder particles.

All the refractory particles used according to the prior art technique may be envisaged, for the matrix and for the aggregate, provided that the powder comprises more than 40% of ATZ particles, i.e. having the following chemical composition, as weight percentages on the basis of the oxides:
10% ≤ $Al_2O_3$ ≤ 55%,
35% ≤ $TiO_2$ ≤ 80%,
1% ≤ $MgO+Cr_2O_3$ ≤ 10%,
8% ≤ $ZrO_2$ ≤ 20%,
$SiO_2$ ≤ 8%.

The presence of $MgO$ and/or $Cr_2O_3$ is necessary in order to stabilize the main phase of the ATZ particles. Above 10%, the metal being melted, and in particular the aluminum being melted, risks "sticking" to the product. This phenomenon is called "clogging".

The presence of $ZrO_2$ in the ATZ particles is necessary so that the product has a mechanical strength that is compatible with the targeted applications. The inventors have discovered that if the ATZ particles do not comprise at least 8% of zirconia, the loss of mechanical strength that results therefrom cannot be compensated for by an addition of zirconia independently of the ATZ particles.

The presence of $SiO_2$ in the ATZ particles is limited to 8% to avoid the aforementioned risk of "sticking" (clogging).

Preferably, to limit the risk of pollution of the bath of metal being melted, the content of $Fe_2O_3$ and/or of alkali metal oxides $K_2O+Na_2O$, and/or of $CaO$ is less than or equal to 1%, or even less than 0.5%. Preferably these oxides are impurities.

The choice of the heat-activatable binder must be made, in particular, as a function of the operating temperature. More specifically, this binder must be activatable under the operating temperature. By way of example, it is not envisaged to use cryolite as heat-activatable binder for an application in which the operating temperature would be below 950° C.

The heat-activatable binder must also be chosen so as to have a melting point below that of the ATZ particles. During the consolidation heat treatment, the heat-activatable binder may thus change from the solid state to a viscous liquid state enabling adhesion to the ATZ particles and bonding between the latter.

A powder according to the invention may be manufactured by mixing raw materials having suitable particle sizes and compositions.

All the known means for compacting a powder according to the invention are possible. Preferably, the particle size distribution of a powder according to the invention is suitable for favoring the compaction thereof. Compaction models such as the Fuller-Bolomey model or the Andreasen may be used in order to determine the most suitable particle size distribution.

EXAMPLES

The following raw materials were used:
molten ATZ10 grains having the following chemical composition, in percentages by weight on the basis of the oxides:

TABLE 1

|  | ATZ 10 |
| --- | --- |
| $Al_2O_3$ | 33.6 |
| $TiO_2$ | 44.1 |
| $ZrO_2$ | 11.7 |
| $MgO$ | 5.18 |
| $SiO_2$ | 4.3 |
| $Fe_2O_3$ | 0.46 |
| $Na_2O$ | 0.14 |
| $CaO$ | 0.06 | brown corindon, having an alumina content of greater than 95%, a silica content of less than 1.2%, a titanium oxide content of less than 3%, an iron oxide content of less than 0.25%, and a grain density of greater than 3.85 g/cm$^3$;

white corindon having an alumina content of greater than 99.6%, and a grain density equal to 3.95 g/cm$^3$;

calcined alumina AC44B6 having an alumina content of greater than 99%, sold by RIO TINTO ALCAN;

clay, having an alumina content equal to 28% with respect to dry product, a percentile $D_{90}$ equal to 40 μm and a loss on ignition measured after heat treatment at 1000° C. for one hour equal to 9%;

boric acid, having an $H_3BO_3$ equivalent of greater than 99.9% and a median size $D_{50}$ equal to 100 µm;

potassium fluoroborate ($KBF_4$), typically containing 96% by weight of potassium fluoroborate, and having a size of less than 100 µm.

The various particulate raw materials, including the heat-activatable binder, are introduced into a mixer, and dry mixed for five minutes.

Each powder thus obtained is introduced into a mixer, also added to which is 1% of dextrin powder, this percentage being relative to the weight of said powder. After five minutes of mixing, 3% of water, as a percentage relative to the weight of the initial powder (therefore without dextrin powder) are added gradually, without stopping the mixer. After introducing all the water, the mixing is continued for five minutes.

The addition of a temporary binder such as dextrin and water are necessary for the manufacture of small samples, but not during an industrial application of the powder in order to form a furnace lining.

The wet mixes are then poured into molds suitable for the manufacture of the following parts:

a consolidated brick having dimensions of 230×114×60 $mm^3$ used for machining bars having dimensions of 150×25×25 $mm^3$ comprising no skin face and as intended for physico-mechanical characterizations (bulk density, open porosity, relative loss of flexural strength after a thermal shock), a cylinder having a diameter of 50 mm and a height of 60 mm pierced at its centre with a hole having a diameter of 12 mm, intended for the thermal expansion measurements, a consolidated brick having dimensions of 230×114×60 $mm^3$ comprising two holes having a diameter of 35 mm and a depth of 30 mm, intended for the tests of infiltration by the metals being melted.

For this purpose, the wet mix poured into the molds is subjected to uniaxial pressing, at a pressure of 90 MPa. The preforms thus obtained are demolded then dried for 24 hours at 110° C.

The cylinder intended for the thermal expansion measurements is not heat treated.

The bricks are consolidated in the following heat cycle:
from 20° C. to 950° C.: increasing at 150° C./h
hold of two hours at 950° C.
decreasing at 150° C./h down to 20° C.

Characterization

The particle size fractions of the powders are determined by dry screening for the grades of $D_{10}$>45 µm and using a HORIBA laser particle size analyzer for the grades of $D_{90}$<100 µm.

The chemical analysis is determined by X-ray fluorescence spectroscopy for the elements having a content of greater than 0.1 wt %. If the content of an element is less than 0.1 wt %, it is determined by ICP (Induction Coupled Plasma), on a Vista AX model (sold by the company Varian).

The measurements of the bulk density and of the open porosity after consolidation heat treatment are carried out according to the following method: the bars mentioned above are firstly dry weighed to determine their dry weight Ms. They are then placed in a bell jar under vacuum of air for 30 minutes. The bell jar is then filled with water, so that the bars are completely immersed. After immersion, the vacuum is maintained for 30 minutes. Atmospheric pressure is then re-established in the bell jar and the samples are left to rest again for 30 minutes. The samples are then subjected to hydrostatic weighing, giving a weight Mi. They are then wiped with a wet cloth and their wet mass Mh is measured.

The bulk density is given by the ratio $\rho \cdot Ms/(Mh-Mi)$, in $g/cm^3$, with $\rho$ being the density of water, taken as being equal to 1 $g/cm^3$.

The open porosity is given by the ratio $100(Mh-Ms)/(Mh-Mi)$, in %.

The resistance to infiltration by the metals being melted is determined by placing the consolidated brick pierced with two holes in contact with a metal being melted. For this purpose, the holes are filled with shavings of an aluminum-silicon alloy of reference 42220 according to the standard NF EN 1706. The whole assembly is then brought to a temperature of 800° C. for a hold time limited to eight hours. After cooling, the infiltration depth is measured.

The relative loss of flexural strength after a thermal shock makes it possible to evaluate the ability of a product to undergo such a shock.

The standardized test PRE III.26/PRE/R.5.1/78 is used to determine the behavior to thermal shocks via the relative loss of flexural strength (% MOR loss) after one cycle consisting in placing a test specimen at a temperature of 600° C., in maintaining the specimen at this temperature for one hour, then in submerging the specimen in cold (20° C.) water.

The specimens are bars as described above heated at 110° C. for 48 hours before carrying out the test.

The flexural strength is measured according to the standard ISO 5014, with a support span of 125 mm. For a given composition, the measurement of the initial flexural strength of the specimens (not subjected to a thermal shock), or "initial MOR" is the mean value measured over three identical specimens; the measurement of the strength after the thermal shock at 600° C., "MOR after TS" is the mean value of the flexural strength measured at ambient temperature on the three specimens after they have undergone said thermal shock; the measurement of the relative loss of flexural strength "% MOR loss" is given by the following formula:

% MOR loss=100·(MOR after TS−initial MOR)/(initial MOR)

The measurement of the thermal expansion coefficient from table 2 is carried out on non-consolidated cylinders having a diameter of 50 mm passed through by a central hole having a diameter of 12 mm, obtained directly by pressing and dried for 24 hours at 110° C. This measurement is carried out according to the standard EN993-19. The measurement is performed between 100 and 900° C. by an RDP brand, DCT 500A model LVDT sensor, with a comparator made of dense sintered alumina.

Results

Table 2 below summarizes the compositions of the powders produced and the results obtained.

TABLE 2

|  | Size | 1 | 2 | Ref. |
|---|---|---|---|---|
| ATZ10 | >1 mm | 33 | 36.5 |  |
| ATZ10 | 0.1-1 mm | 21 | 23 |  |
| ATZ10 | <0.1 mm | 2 | 2.5 |  |
| Total ATZ10 |  | 56 | 62 |  |
| Brown corindon | >1 mm |  |  | 38.5 |
| Brown corindon | 0.1-1 mm | 15.5 | 13 | 36.5 |
| White corindon | <0.1 mm | 16.5 | 14 | 15 |
| Calcined alumina | <50 µm | 3.5 | 3 | 2 |
| Calcined clay | <150 µm | 5.5 | 5 | 5 |
| Boric acid |  | 2 | 2 | 2 |
| $KBF_4$: potassium fluoroborate |  | 1 | 1 | 1 |
| Bulk density (g/cm³) |  | 2.96 | 2.96 | 3.02 |
| Open porosity (%) |  | 19.5 | 19.8 | 18.2 |

TABLE 2-continued

| Size | 1 | 2 | Ref. |
|---|---|---|---|
| % MOR loss after 1 thermal shock at 600° C. | 0 | 19 | 43 |
| % MOR loss after 2 thermal shocks at 600° C. | 2 | 19 | 54 |
| Thermal expansion coefficient between 100° C. and 900° C. (° C.$^{-1}$) | $5.7 \cdot 10^{-6}$ | $5.5 \cdot 10^{-6}$ | $8.5 \cdot 10^{-6}$ |
| Infiltration depth of the metal (mm) | 0 | | 0 |

The inventors consider that the results are particularly satisfactory if they fulfill the following compromise:
  (a) The infiltration depth of the metal is less than or equal to 1 mm, preferably zero;
  (b) The MOR loss after thermal shock(s) is less than or equal to 30%.

Furthermore, the inventors consider that, in order to avoid cracking, it is essential that the thermal expansion coefficient of the product is as low as possible, while remaining positive.

As is now clearly apparent, the invention provides a powder that makes it possible to manufacture consolidated products having a good mechanical resistance to thermal shocks, a good resistance to cracking and a good resistance to infiltration by the metals being melted.

Furthermore, other tests have shown that a powder according to the invention is easy to install, has a low cost and that it results in a consolidated product having a good chemical inertia with respect to the metals being melted, capable of effectively withstanding corrosion by these metals being melted. A consolidated product according to the invention is therefore perfectly suitable for an application in a furnace for melting metals, in particular in an induction furnace.

Of course, the invention is not limited to the embodiments provided by way of examples.

The invention claimed is:

1. A powder comprising more than 70% of refractory particles, as a percentage by weight in relation to the weight of the powder, said powder comprising, in percentages by weight in relation to the weight of the powder:
  from 0.1% to 18% of particles of a heat-activatable binder, referred to as "heat-activatable binder particles", and
  more than 40% of refractory particles, referred to a "ATZ particles", having the following chemical composition, in percentages by weight on the basis of the oxides of said ATZ particles:
  $10\% \leq Al_2O_3 \leq 55\%$,
  $35\% \leq TiO_2 \leq 80\%$,
  $1\% \leq MgO+Cr_2O_3 \leq 10\%$,
  $8\% \leq ZrO_2 \leq 20\%$,
  $SiO_2 \leq 8\%$.

2. The powder as claimed in claim 1, wherein the heat-activatable binder is an inorganic binder and/or at least one resin.

3. The powder as claimed in claim 1, comprising more than 50% of ATZ particles.

4. The powder as claimed in claim 1, wherein the composition of the ATZ particles is such that the content of $Al_2O_3$ is greater than 35%, as weight percentages on the basis of the oxides of said ATZ particles.

5. The powder as claimed in claim 1, wherein the composition of the ATZ particles is such that the content of $TiO_2$ is greater than 40% and less than 55%, as weight percentages on the basis of the oxides of said ATZ particles.

6. The powder as claimed in claim 1, wherein the composition of the ATZ particles is such that:
  the content of $MgO+Cr_2O_3$ is greater than 2% and less than 8%; and/or
  the content of $Cr_2O_3$ is less than 0.5%; and/or
  the content of $ZrO_2$ is less than 15%; and/or
  the content of $SiO_2$ is less than 5%; and/or
  $Fe_2O_3 \leq 1\%$,
  as weight percentages on the basis of the oxides of said ATZ particles.

7. The powder as claimed claim 1, wherein the composition of the ATZ particles is such that the content of $SiO_2$ is less than 2%, as weight percentages on the basis of the oxides of said ATZ particles.

8. The powder as claimed in claim 1, wherein the ATZ particles are fused particles.

9. The powder as claimed in claim 1, a particle of said powder being classified in the "matrix" fraction or in the "aggregate" fraction depending on whether it has a size less than or equal to 100 µm, or greater than 100 µm, respectively, wherein the matrix represents less than 40% of the weight of the powder, and wherein more than 60% of the grains of the aggregate are ATZ particles, as percentages on the basis of the weight of the aggregate.

10. The powder as claimed in claim 1, wherein the heat-activatable binder is selected from the group formed by boron oxide, boric acid, borates, cryolite, fluoride salts, silicate compounds, phosphate compounds, feldspars, magnesium chlorides, colemanite, clay, kaolin, amorphous silica, in particular fumed silica, phenolic resins, furan resins, ceramic frits, and mixtures thereof.

11. The powder as claimed in claim 10, wherein the heat-activatable binder is selected from the group formed by sodium borates, potassium borates, calcium borates, boric acid, boron oxide, clay, fluoride salts, and mixtures thereof.

12. The powder as claimed in claim 1, wherein the ATZ particles comprise:
  an oxide phase in the form of a solid solution of aluminum titanate type comprising:
    titanium,
    aluminum,
    iron,
    magnesium and/or chromium, and
    zirconium,
  said oxide phase representing at least 60% of the total weight of the oxides of the ATZ particles; and/or
  a minor silicate phase comprising more than 40% of silica, as a weight percentage on the basis of said silicate phase; and/or
  a minor phase comprising more than 80% of titanium oxide $TiO_2$ and/or of zirconium oxide $ZrO_2$, as a weight percentage on the basis of said minor phase.

13. The powder as claimed in claim 1, consisting of refractory particles, heat-activatable binder particles, optionally anti-dust agent particles, optionally particles of an anti-wetting agent chosen from silicon carbide, barium sulfate, SiAlON, and nitrides, and impurities.

14. The powder as claimed in claim 1, comprising neither hydraulic binder nor organic binder.

15. The powder as claimed in claim 1, comprising
  between 5% and 15% of an anti-wetting agent chosen from silicon carbide, SiAlON, nitrides, and/or
  between 0.1% and 1% of an anti-dust agent chosen from the group formed by oils, in particular mineral oils, kerosene, organic polymers and mixtures thereof.

16. The powder as claimed in claim 1, more than 95% as a percentage by weight constituted of refractory particles, of heat-activatable binder particles, optionally of anti-dust agent particles and optionally of anti-wetting agent particles, the balance to 100% being constituted by impurities.

17. A product obtained by consolidation heat treatment:
of a powder according to claim 1 or
of a mix comprising a powder as claimed in claim 1, and
a temporary binder in an amount of greater than 0.5% and less than 6%, and/or
water in an amount of water of greater than 2% and less than 6%,
in percentages by weight relative to the weight of the powder before addition of the temporary binder and water,
the heat-activatable binder forming a binder phase between the refractory particles.

18. A furnace for melting metals comprising at least one region intended to be in contact with a metal being melted, said region being constituted of a consolidated product as claimed in claim 17.

19. The furnace as claimed in claim 18, the heat-activatable binder being chosen so as to be in a viscous state during the first temperature rise in the furnace.

20. A process for manufacturing a consolidated product, comprising the following successive steps:
a) preparation of a feedstock from a powder as claimed in claim 1,
(1) the feedstock comprising a powder as claimed in claim 1 and a liquid phase in said feedstock representing less than 3% of the weight of the feedstock; or
(2) the feedstock being constituted of a mix comprising a powder as claimed in claim 1 and
a temporary binder in an amount of greater than 0.5% and less than 6%, and/or
water in an amount of water of greater than 2% and less than 6%, in percentages by weight relative to the weight of the powder before addition of the temporary binder and water,
b) forming said feedstock by pressing, ramming or vibration;
c) consolidation heat treatment of the formed feedstock at a temperature above the melting point of the heat-activatable binder.

* * * * *